US009761072B2

(12) United States Patent
Arfwedson et al.

(10) Patent No.: US 9,761,072 B2
(45) Date of Patent: Sep. 12, 2017

(54) PASSIVE LOCKING SYSTEM COMPRISING MEANS FOR INSIDE AND OUTSIDE DETECTION (71) Applicant: Sweden Connectivity AB, Kista (SE)

(72) Inventors: Henrik Arfwedson, Kista (SE); Peter Thellenberg, Kista (SE); Stefan Larsson, Kista (SE)

(73) Assignee: SWEDEN CONNECTIVITY AB (SE)

( * ) Notice: Subject to any disclaimer, the term of this patent is extended or adjusted under 35 U.S.C. 154(b) by 0 days.

(21) Appl. No.: 15/101,835

(22) PCT Filed: Nov. 28, 2014

(86) PCT No.: PCT/SE2014/051420
§ 371 (c)(1),
(2) Date: Jun. 3, 2016

(87) PCT Pub. No.: WO2015/084235
PCT Pub. Date: Jun. 11, 2015

(65) Prior Publication Data
US 2016/0307385 A1  Oct. 20, 2016

(30) Foreign Application Priority Data
Dec. 6, 2013 (SE) ...................... 1351461

(51) Int. Cl.
G07C 9/00 (2006.01)
(52) U.S. Cl.
CPC ..... G07C 9/00309 (2013.01); G07C 2209/63 (2013.01)

(58) Field of Classification Search
CPC ............ G07C 2209/63; G07C 9/00111; G07C 9/00309
See application file for complete search history.

(56) References Cited

U.S. PATENT DOCUMENTS 4,700,186 A * 10/1987 Fujino ................ G07C 9/00182
340/12.5
6,906,612 B2 * 6/2005 Ghabra ................... B60R 25/24
340/5.61

(Continued)

FOREIGN PATENT DOCUMENTS

EP           1762678 A1    3/2007
WO    WO 2012/174387 A2   12/2012

Primary Examiner — Nay Tun
(74) Attorney, Agent, or Firm — Condo Roccia Koptiw LLP (57) ABSTRACT A locking system and method for door and passage unlocking is provided. The system comprises a locking unit adapted to lock and unlock a door, a mounted wireless signal transceiver connected to the locking unit, and a handheld wireless signal transceiver adapted to communicate with the mounted wireless signal transceiver with a patch antenna. The mounted or handheld wireless signal transceiver is adapted to detect the signal strength of the remote wireless signal transceiver, and the locking system further comprises a calculating unit adapted to calculate if the person is on the first or second side of the door based on changes in the detected signal strength. The calculating unit is adapted to determine whether or not to unlock the door on the basis of the detected signal strength and the calculated information related to the person being on the first or second side of the door.

22 Claims, 6 Drawing Sheets (56) References Cited

U.S. PATENT DOCUMENTS

| | | |
|---|---|---|
| 2005/0258936 A1 | 11/2005 | Ghabra et al. |
| 2008/0290990 A1 | 11/2008 | Schaffzin et al. |
| 2009/0160608 A1 | 6/2009 | Inoue |
| 2011/0309922 A1* | 12/2011 | Ghabra .................... B60R 25/24 340/426.36 |
| 2012/0234058 A1* | 9/2012 | Neil .................... G07C 9/00571 70/91 |
| 2012/0252365 A1 | 10/2012 | Lam |
| 2012/0286926 A1* | 11/2012 | Higemoto ............... B60R 25/24 340/5.61 |
| 2013/0237193 A1 | 9/2013 | Dumas et al. |
| 2013/0241694 A1 | 9/2013 | Sharma et al. |

* cited by examiner

PASSIVE LOCKING SYSTEM COMPRISING MEANS FOR INSIDE AND OUTSIDE DETECTION

CROSS REFERENCE TO RELATED APPLICATIONS

This application is the National Stage Entry under 35 U.S.C. §371 of Patent Cooperation Treaty (PCT) Application No. PCT/SE2014/051420, filed Nov. 28, 2014, which claims the benefit of Sweden Patent Application No. 1351461-7, filed Dec. 6, 2013, the contents of which are hereby incorporated by reference in their entirety.

TECHNICAL FIELD

The present invention relates to wireless passage and locking systems.

BACKGROUND

In recent years there has been a development from traditional mechanical keys to electronic keys. Electronic keys can be active, such as the IR key traditionally used to unlock cars, or such as some NFC based systems. In alternative embodiments, the electronic keys may be passive, such as magnetic cards, barcode cards, RFID based systems, or fingerprint based systems.

The electronic keys listed above all have one thing in common, and that is that they require the user to be active. In the example with a magnetic or bar code card, this card needs to be swiped in a reader, in the example with an RFID or NFC based system, the card or tag needs to be placed in front of a reader, and in the example with fingerprint based systems, the finger of the user needs to be placed on some form a fingerprint scanner.

The active step that is performed by the user ensures that the intention of the user is to unlock the lock connected with the electronic key. Hence, as the unlocking involves an active step, the risk that the user will unintentionally unlock the lock is very low.

In some applications where a lock is needed, the person that should use the lock may be unable to perform the active steps that these devices require. Such applications could for example be when the person is mentally or physically disabled. Additional considerations that includes the fact that some locking systems are slow and thus requires some time to fully unlock door, and the fact that some locking systems consumes a lot of power in operation, which may be a drawback in battery operated system.

There is thus a need for an electronic key which does not require the active step by the user, while at the same time ensuring that the intention of the person is to lock or unlock the locking mechanism operated by the electronic key.

SUMMARY

A locking system and method for door locking is provided. The system comprises a locking unit adapted to lock and unlock a door, a mounted wireless signal transceiver connected to the locking unit, and a handheld wireless signal transceiver adapted to communicate with the mounted wireless signal transceiver. The mounted wireless signal transceiver comprises an antenna adapted to transmit a wireless signal with a first higher magnitude on a first side of the door, and a second lower magnitude on a second side of the door.

According to one embodiment, the mounted wireless signal transceiver is adapted to detect the signal strength of the handheld wireless signal transceiver, and in an alternative embodiment the handheld wireless signal transceiver is adapted to detect the signal strength of the mounted wireless signal transceiver. A combination thereof is also conceivable.

The locking system further comprises a calculating unit adapted to calculate if the person is on the first or second side of the door based on the detected signal strength. The calculating unit is adapted to determine whether or not to unlock the door on the basis of the detected signal strength and the calculated information related to the person being on the first or second side of the door. The system enables unlocking of a door without any active steps by the person unlocking the door, i.e. the person could for example keep the handheld wireless signal transceiver in e.g. his/her pocket and just walk through the door, as the door will be unlocked.

The handheld wireless signal transceiver may comprise the calculating unit, or the calculating unit may be comprised in the mounted wireless signal transceiver, which for example could be a decision taken on the basis of power consumption and/or the requirements with regards to the size of the handheld and mounted wireless signal transceivers.

According to one embodiment, the locking unit may further comprise a sensor capable of generating a state signal on the basis of a mechanical state of the door, and the calculating unit is further adapted determine whether or not to unlock the door on the basis of the received state signal. This state signal may be provided as an additional determining value which is physically connected to the state of the door.

The handheld wireless signal transceiver may further be adapted to calculate or receive RSSI from at least one auxiliary wireless signal transceiver, which may further increase the certainty of the information that the handheld wireless signal transceiver is on the first or second side of the door.

The system may further comprise a central unit adapted to communicate with the handheld wireless signal transceiver, such that the handheld wireless signal transceiver can remain connected when being away from the mounted wireless signal transceiver. The central unit could also be adapted to communicate with the handheld wireless signal transceiver for uploading or downloading data from or to the handheld wireless signal transceiver.

The locking unit could for example comprise an electrical motor or solenoid adapted to operate to unlock the door, and the antenna could for example be a patch antenna which generates a directed electronic field and is easy to manufacture.

The mounted wireless signal transceiver or the handheld wireless signal transceiver could in any of the embodiments herein be adapted to detect signal strength by detecting RSSI.

A handheld wireless signal transceiver for use in the system according to any one of the embodiments herein, and a mounted wireless signal transceiver for use in the system according to any one of the embodiments herein are further provided.

Please note that the embodiments herein could be combined in any way unless clearly contradictory.

BRIEF DESCRIPTION OF THE DRAWINGS

The invention is now described, by way of example, with reference to the accompanying drawings, in which.

DETAILED DESCRIPTION

In the following a detailed description of embodiments of the invention will be given with reference to the accompanying drawings. It will be appreciated that the drawings are for illustration only and are not in any way restricting the scope of the invention. Thus, any references to directions, such as "up" or "down", are only referring to the directions shown in the figures. It should be noted that the features having the same reference numerals have the same function, a feature in one embodiment could thus be exchanged for a feature from another embodiment having the same reference numeral, unless clearly contradictory. The descriptions of the features having the same reference numerals should thus be seen as complementing each other in describing the fundamental idea of the feature and thereby showing the features versatility.

A locking system is provided which enables the operation of a door lock by means of a hand held wireless signal transceiver, such that the person keeping the wireless signal transceiver and wanting to unlock the door do not have to take any active steps for unlocking the door, such as using a key. The system further establishes that the person keeping the wireless signal transceiver is on the intended side of the door for an unlocking operation to be performed by a locking unit.

The system for example enables a physically or mentally disabled person (such as a person suffering from dementia) to unlock his/her door without any active steps when approaching the door from the intended direction thereof, and thus being on the "correct" side of the door. This could for example mean that a door to a home or a room should unlock when the person keeping the handheld wireless signal transceiver is approaching the door from the outside of the home or room, and not unlock the door when the person is approaching the door from inside the home or room. In the example with the person suffering from dementia, this will create the impression that the door to the person's home or room is open at all times from the outside when the person approaches the person from the outside thereof. In the embodiments where the door is unlocked when the person is approaching the door (for example when the person is 4 meters away from the door) even locks with a relatively slow operation will have time to fully unlock. The handheld wireless signal transceiver could be a small device, a tag or could be incorporated in a wrist watch or a mobile telephone or worn as a necklace.

The step of determining if a person is inside of a home or room or outside a home or room may be used for a number of additional purposes other than unlocking the door. E.g. in a home for elderly or mentally disabled persons, information with regards to the persons being in their rooms may be uploaded to a central unit (further described with reference to FIG. 5) which for example may be monitored by staff of the home or alternatively e.g. by the staff of a hotel. The information could also be made available to relatives, care givers or neighbors in instances where that would be relevant to the care of the person.

A door is to be understood in the broadest sense as to mean any barrier which separates a first area from a second area, and could for example be a door to a home or a room, a gate, a garage door etc.

The locking system further comprises a locking unit adapted to lock and unlock a door. A locking unit is to be understood as any operable mechanical element capable of locking a door, and could for example be a regular lock with an operable bolt mounted in the door and being operable to engage a recess in the doorframe.

The locking system further comprises a mounted wireless signal transceiver, being mounted in the door and connected to the locking unit, such that a signal from the mounted wireless signal transceiver can trigger the locking unit and thus unlock the door. In alternative embodiments, the locking unit is mounted in the door frame, in which case the mounted wireless signal transceiver may be mounted in the door frame as well.

The system further comprises a handheld wireless signal transceiver adapted to communicate wirelessly with the mounted wireless signal transceiver. The handheld and mounted wireless signal transceivers could for example be radio transceivers based on Bluetooth© technology operating in 2400-2483.5 MHz range, or radio transceivers based on the IEEE 802.11 standard (Wi-FI) operating in the 2.4 GHz or 5 GHz range, based on technology known as Wi-Fi Direct or proprietary radio technologies operating on various frequencies.

The mounted wireless signal transceiver mounted in the door or at the door frame comprises a first antenna, which could be an antenna adapted to transmit a directed electrical field, such as a patch antenna. The antenna is thus configured or mounted in a way such that it is adapted to transmit a wireless signal with a first higher magnitude on a first side of the door and a second lower magnitude on a second side of the door, and thus be capable of receiving signals with a lower magnitude on the first side of the door than on the second side of the door. The main antenna lobe is thus directed in a first direction, away from the door, while a minor lobe, or side lobe, is directed in a second direction away from the door. The directional configuration of the antenna may be additionally assisted by the antenna being placed on the door and thus using the door as a screen, further contributing to the shape of lobe being such that the electrical field has a first higher magnitude on a first side of the door and a second lower magnitude on a second side of the door. In some embodiments the antenna may be possible to shape in relation to the surroundings in which it is placed e.g. on the basis of the geometry of the room on the first or second side of the door, such that the electrical field can be adapted to the location of the mounted signal transceiver. In the example with a patch antenna, the antenna could be made from thin flexible material, such that it can be shaped in a pre-defined way.

The mounted wireless signal transceiver and/or the handheld wireless signal transceiver further comprises capabilities for detecting signal strength, which for example could be performed using RSSI or by adapting the strength of a signal such that it is possible to assess at what signal strength the connection is deteriorating (Packet Error Rate, PER). For the purpose of detecting signal strength, the handheld or mounted wireless signal transceiver may comprise logic adapted to register and store detected signal strengths. In embodiments where the handheld wireless signal transceiver comprises capabilities for detecting signal strength (a detection unit) and logic, the handheld wireless signal transceiver is adapted to detect the signal strength of the mounted wireless signal transceiver, and in embodiments where the mounted wireless signal transceiver comprises the capabilities for detecting signal strength (the detection unit) and logic, the mounted wireless signal transceiver is adapted to detect the signal strength of the handheld wireless signal transceiver.

The system further comprises a calculating unit placed in the handheld wireless signal transceiver and/or in the mounted wireless signal transceiver or in relation to the door. The calculating unit is adapted to receive the measured signal strengths, and calculate if the person is on the first or second side of the door based on the detected signal strengths and unlock at threshold RSSI values, i.e. when the person is close enough to the door and on the correct side of the door, e.g. by comparing RSSI of the sampled signals on the first and second side of the door.

The calculating unit is thus adapted to determine whether or not to unlock the door on the basis of the detected signal strength, i.e. the signal strength of particular samples, and the calculated information related to the person being on the first or second side of the door, which is either calculated momentarily, concurrently with the detection of the signal strength, or calculated in advance and stored in a memory of the calculating unit, such that the information with regards to the person being on the first or second side of the door can be fetched by the calculating unit.

Figure 1A:
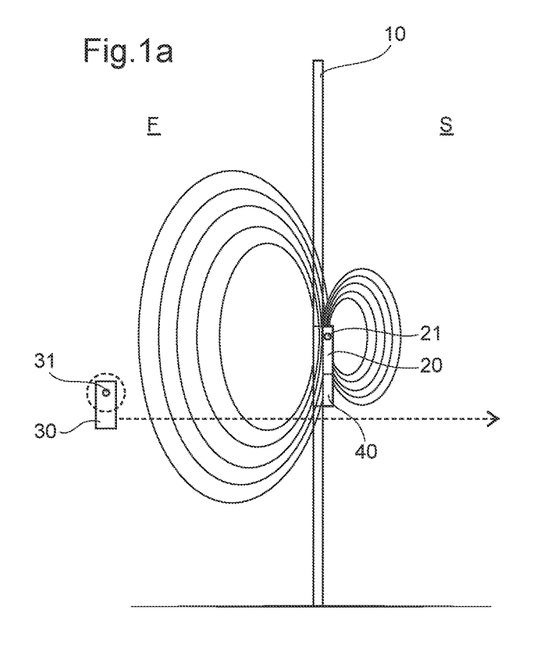
FIG. 1a is a schematic side view of an embodiment of a door or a passage incorporating the locking system.

FIG. 1a shows an embodiment of the systems for locking and unlocking a door 10. The system comprises a locking unit 40 adapted to lock and unlock a door 10. The locking unit 40 is fixated to the door 10 (which is seen in a side view). The locking unit 40 may be fixated at least partially in a recess in the door 10. The locking unit 40 is connected to a mounted wireless signal transceiver 20 comprising an antenna 21. The antenna 21 is according to one embodiment a patch antenna and could for example be placed in the recess facing the first side F of the door 10. Alternatively, the antenna 21 may be placed on the surface of the door 10, on the first side F thereof, in any instance; it is advantageous to place the antenna 21 such that a relatively small amount of blocking material is placed between the antenna 21 and the first side F of the door 10.

The antenna 21 of the mounted wireless signal transceiver 20 is adapted to transmit a wireless signal with a first higher magnitude on a first side F of the door 10, and a second lower magnitude on a second side S of the door 10.

The system further comprises a handheld wireless signal transceiver 30 adapted to communicate with the mounted wireless signal transceiver 20, for example by means of Bluetooth© technology operating in 2400-2483.5 MHz range, or radio transceivers based on the IEEE 802.11 standard (WiFi) operating in the 2.4 GHz or 5 GHz range, or based on technology known as WiFi Direct or proprietary radio technologies operating on various frequencies. The handheld wireless signal transceiver functions as a radio operated key, signaling at a specific frequency and carrying encrypted ID information and data specific to that key, and can thus be kept in a pocket, bag or e.g. as a wristwatch. When the handheld wireless signal transceiver 30, and its electric field, is moved through the electric field emitted by the mounted wireless signal transceiver 20, the signal strength between the handheld 30 and mounted 20 wireless signal transceivers varies depending on the distance between the handheld 30 and mounted 20 wireless signal transceivers. The mounted wireless signal transceiver 20 or the handheld wireless signal transceiver 30 comprises the capability to detect the signal strength there between, and thus detect the signal strength between the mounted wireless signal transceiver 20 and the handheld wireless signal transceiver. The mounted 20 and/or the handheld 30 wireless signal transceiver further comprises a calculating unit (22/32 of FIGS. 2a, 2b and 4) adapted to calculate if the person is on the first F or second S side of the door 10 based on a change in the detected signal strength.

As the person keeping the handheld wireless signal transceiver 30, moves towards the door, and as the mounted wireless signal transceiver 20 transmits a wireless signal with a first higher magnitude on a first side F of the door 10, and a second lower magnitude on a second side S of the door 10, the signal strength will be much higher on the first side F of the door 10 compared to the second side S of the door 10. Thus, by analyzing samples of the signal strength over time, the calculating unit can determine if the handheld wireless signal transceiver 30 is moving towards the door 10 or away from the door 10, and if the handheld wireless signal transceiver 30 is moving towards the door 10 from the first F or second S side thereof.

According to one embodiment, the system should unlock the door 10 when a person approaches the door 10 from the first side F thereof (which for example could be from the outside of a home or room), when the person is close enough, which for example could mean that the person is e.g. 4, 3, 2 or 1 meters away from the door 10. In this embodiment, the door 10 will have time to unlock, even if the locking unit 40 is a locking unit 40 operated by an electrical motor, which requires a few second to complete the unlocking maneuver. As the system is adapted to only unlock the door 10 when the person is approaching the door 10 from the first side F thereof, the door 10 will remain locked (at least from the outside) when the person keeping the handheld wireless signal transceiver 30 approaches the door 10 from the second side S thereof (for example approaching the door 10 from the inside of a home or room). In some embodiments however, it will be considered ok to unlock the door from the second side thereof if the person is very close to the door and thus obviously intends to exit. In accordance with this embodiment, the lock will remain in its unlocked state on the basis of a timer, e.g. for 5 seconds, after which the lock will return to its locked state, unless the system is controlling the lock to remain open, e.g. by the handheld wireless signal transceiver still being close enough and on the correct side of the door.

The calculating unit (22/32 of FIGS. 2a, 2b and 4), which is adapted to calculate the position and direction of the handheld wireless signal transceiver, can be placed in the handheld 30 or mounted 20 wireless signal transceiver or in a combination of the two. The advantage with placing the calculating unit in the handheld wireless signal transceiver 30 is that the calculating unit is power consuming, and the handheld wireless signal transceiver can be easily charged by for example placing the handheld wireless signal transceiver 30 in a charger. The advantage with placing the calculating unit in the mounted wireless signal transceiver 20 is that the handheld wireless signal transceiver 30 can thus be made smaller and thus more convenient to carry. In some embodiments the calculations can be divided between the handheld and mounted wireless signal transceivers, or the calculations could be performed by the unit currently having the best battery capacity.

Generally, the handheld wireless signal transceiver 30/20 could, for example, be programmed with a unique device ID. The device ID could either be loaded into the handheld wireless signal transceiver 30 at production or at a later stage, for example at installation of the wireless locking system. Upon installation of the wireless locking system, the device IDs of the handheld wireless signal transceiver 30, which is to be associated with a specific mounted wireless signal transceiver 20 could be imprinted into the mounted wireless signal transceiver 20. Additionally, the mounted wireless signal transceiver 30 could be updated at a later stage with new device IDs. The device ID could then be used by the mounted wireless signal transceiver 20 to connect only to the handheld wireless signal transceiver 30 it is programmed to connect to. To achieve high security, the device ID could be changed on a regular basis in such a way that only the handheld wireless signal transceiver 30 and the mounted wireless signal transceiver 20 knows each other's true identity.

The first connection between the handheld wireless signal transceiver 30 and the mounted wireless signal transceiver 20 should always take place in conjunction with the production or installation of the wireless locking system or update of the mounted wireless signal transceiver. Furthermore, upon the first connection between the handheld wireless signal transceiver 30 and the mounted wireless signal transceiver 20, a security key could be generated by both parties and shared between them. The security key could be used for authentication of the wireless connection and encryption of the data transmitted over the air. If the security key is lost, it could mean that the handheld wireless signal transceiver 30 in question no longer can connect to the mounted wireless signal transceiver 20. An update of the mounted wireless signal transceiver would then be needed to generate new security keys.

Figure 1B:
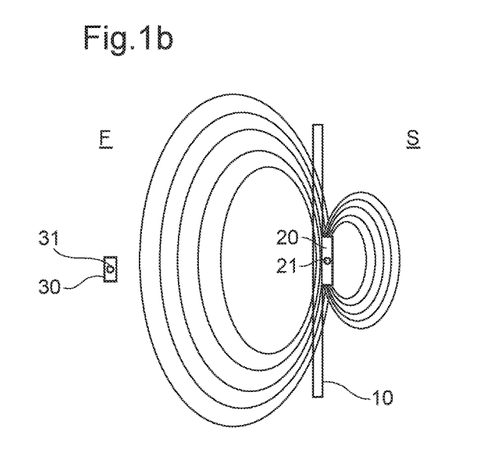
FIG. 1b is a schematic top view of an embodiment of a door or a passage incorporating the locking system.

FIG. 1*b* shows the door 10 in accordance with the embodiment shown in FIG. 1*a*, but in a top view. The transmitted electrical field has a major lobe on the first side F of the door and a minor or secondary lobe on a second side S of the door, i.e. the signal strength is larger on the first side F of the door than on the second side of the door S.

Figure 1C:
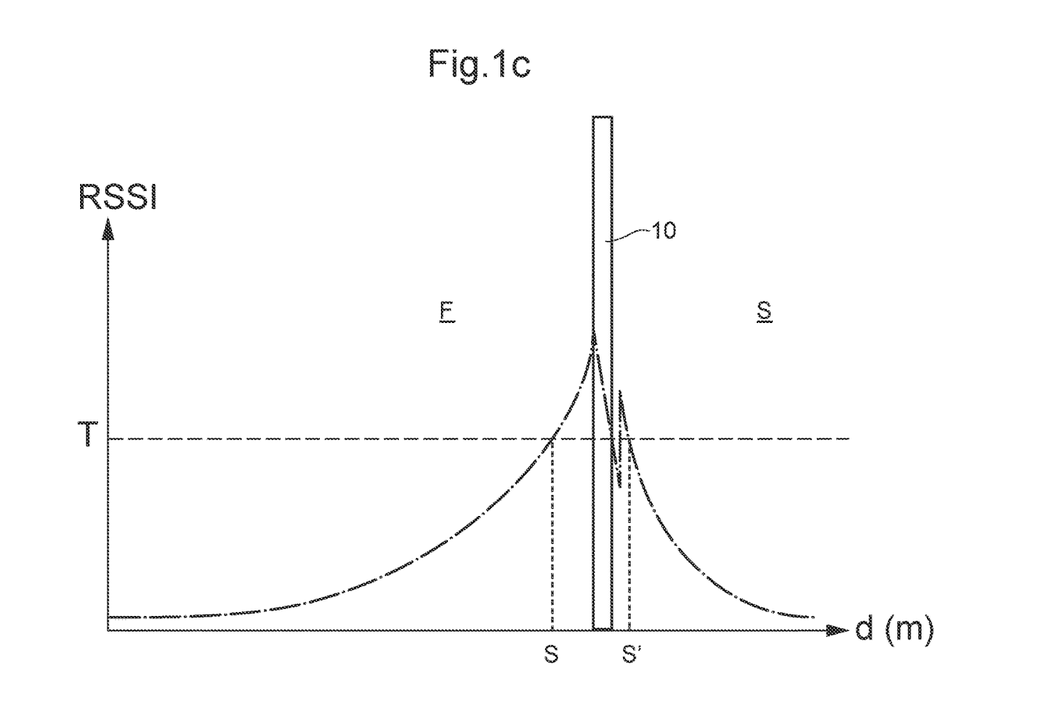
FIG. 1c is a graph of the signal strength when a handheld wireless signal transceiver is moved passed the door or opening.

FIG. 1*c* shows a graph of signal strength measured as RSSI (Received Signal Strength Indication) in relation to the distance from the door 10 in meters. As the antenna 21 mounted on or in relation to the door 10 is adapted to transmit (and receive) a wireless signal with a first higher magnitude on a first side F of the door 10, and a second lower magnitude on a second side S of the door 10, and as the signal strength decreases when the distance from the antenna 21 increases, the RSSI at a specific distance from the door will be much higher on the first side F of the door in comparison to the RSSI at the same distance on a second side S of the door. The RSSI on the first side F of the door will thus reach the threshold value T much further from the door (illustrated by sample value S) than the RSSI on the second side of the door (illustrated by sample value S'), i.e. the difference in distance between the first sample value S and a second sample value S' being samples collected when the handheld wireless signal transceiver is moved passed the door and thus through the electric field transmitted by the mounted wireless signal transceiver. It is for example possible to use one or more of peak, min, spread or average signal strengths to compare the signals strength from the first side of the door with the signal strength from the second side of the door, as the peak signal strength on the first side of the door is much higher than the peak signal strength on the second side of the door. The calculations may additionally be assisted by an auxiliary signal transceiver providing a reference signal to the transceiver.

In the embodiment shown in FIG. 1*c*, when the signal strength reaches the threshold signal strength T an "unlock" signal is generated which is used for determining if the door should be unlocked. As the signal strength is higher on the first side, the threshold T will be reached much earlier, i.e. further from the door, when the handheld wireless signal transceiver is on the first F side of the door.

Figure 2A:
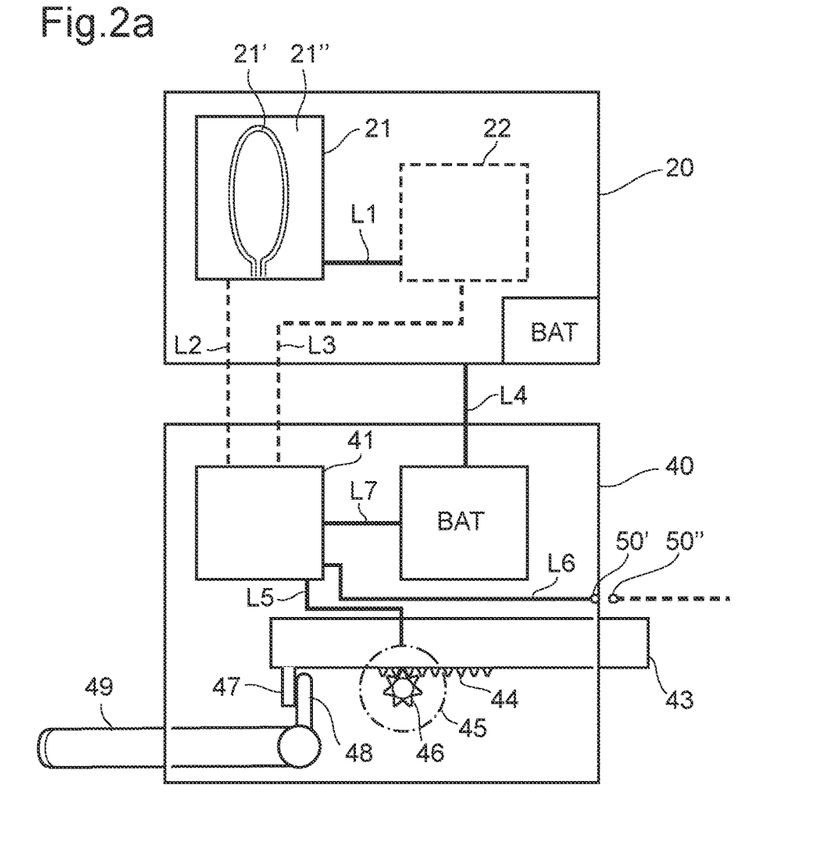
FIG. 2a is a schematic view of the components of an embodiment of a locking unit and a mounted wireless signal transceiver.

FIG. 2*a* shows an embodiment of the mounted wireless signal transceiver 20 and the locking unit 40, in a more detailed, schematic view. The mounted wireless signal transceiver 20 and the locking unit 40 could be mounted to a door (for example placed in a recess or on the inside of a door 10 as shown in FIG. 1*a*) or could be mounted to a door frame. The mounted wireless signal transceiver 20 comprises an antenna 21 in the form of a patch antenna which is configured to transmit a wireless signal with a higher magnitude in the direction out from the drawing, and a lower magnitude in a direction into the drawing. The patch antenna typically consists of a flat sheet or "patch" of metal 21', mounted over a larger sheet of metal 21" called a ground plane.

The mounted wireless signal transceiver 20 could optionally comprise a calculating unit 22 (the purpose of which is described with reference to FIGS. 1*a* and 4). The calculating unit 22 comprises a processing unit, which may be a single CPU (Central Processing Unit), or could comprise two or more processing units. For example, the processor may include a general purpose microprocessor, an instruction set processor and/or related chips sets and/or special purpose microprocessors such as ASICs (Application Specific Integrated Circuit). The processor may also comprise board memory for caching purposes. The calculating unit 22 is connected to the antenna 21 by means of a lead L1, such that signals received can be transferred to and processed by the calculating unit 22.

The mounted wireless signal transceiver 20 could be powered by an energy source BAT placed in the mounted wireless signal transceiver 20, or may be powered from the connection L4 with an energy source BAT of the locking unit 40.

Now turning to the locking unit 40. The locking unit 40 comprises a control unit 41, connected to the antenna 21 of the mounted wireless signal transceiver by means of a lead L2, such that the control unit 41 can receive and transmit signals to and from the antenna 21. In instances where the mounted wireless signal transceiver 20 comprises the calculating unit 22, the control unit is additionally connected to the calculating unit by means of a lead L3 for receiving signals related to the operation of the locking unit 40 i.e. locking and unlocking. The control unit 41 is adapted to control the operation of an electrical motor 45 which propels a gear wheel 46, the teeth of which engaging the teeth on a linear gear bar 44 fixated to the bolt 43 of the locking mechanism, such as to linearly move the gear bar 44 to lock and unlock the door to which the locking mechanism is mounted. The locking unit 40 further comprises a handle 49 pivotally mounted and comprising a protrusion 48 adapted to engage a protrusion 47 of the locking bolt 43. The handle 49 can thus over ride the electrical motor 45 and enable the door 10 to be mechanically unlocked, for example from the second side of the door, such that the door can be manually opened from e.g. the inside of a home or room at all times.

In some embodiments, the step of unlocking is triggered by the wireless signaling, while the step of locking is triggered by a timer which tells the locking unit 40 to lock after having been open a pre-determined time.

The electrical motor 45 is controlled and powered by the control unit 41 by means of the connection by the lead L5. The control unit 41 is in turn connected to an energy source BAT of the locking unit 40 by means of a lead L7. The control unit 41 is further connected to the antenna 21 of the mounted wireless signal transceiver 20 by means of a lead L2 and/or to the calculating unit 22 of the mounted wireless signal transceiver 20 by means of a lead L3. In some embodiments, the control unit 41 and the calculating unit 22 may be integrated in a single unit.

In alternative embodiments, the electrical motor 45 could be replaced by a solenoid performing the function of unlocking the door by retracting the locking bolt 43.

The locking unit 40 in the embodiment shown in FIG. 2*a* further comprises a sensor 50' connected to the control unit 41 by means of a lead L6. The sensor 50' is capable of generating a state signal on the basis of a mechanical state of the door, which the calculating unit may use to determine whether or not to unlock the door. The sensor 50' could for example be a magnetic or optical sensor sensing the presence or a particular portion of the door frame 50" and thus sensing if the door is in its opened or closed state.

In the embodiment disclosed in FIG. 2*a*, the mounted wireless signal transceiver 20 and the locking unit 40 are powered by means of energy sources in the form of batteries BAT, however, it is equally conceivable that the batteries BAT are replaced or assisted by a grid connection, which removes the need for charging or replacing the batteries BAT.

Figure 2B:
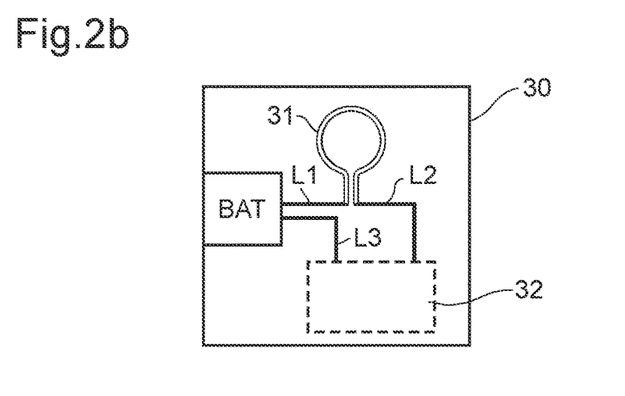
FIG. 2b is a schematic view of the components of an embodiment of a handheld wireless signal transceiver.

FIG. 2*b* shows a schematic 30 view of the handheld wireless signal transceiver 30. The handheld wireless signal transceiver 30 comprises an antenna 31 which a receiving unit regards as a substantially omni-directional antenna such that the rotational or location impact of the handheld wireless signal transceiver 30 is minimized for the wireless connection between the handheld wireless signal transceiver 30 and the mounted wireless signal transceiver 20.

The handheld wireless signal transceiver 30 could optionally comprise a calculating unit 32 (the purpose of which is described with reference to FIGS. 1*a* and 4). The calculating unit comprises a processing unit, which may be a single CPU (Central Processing Unit), or could comprise two or more processing units. For example, the processor may include a general purpose microprocessor, an instruction set processor and/or related chips sets and/or special purpose microprocessors such as ASICs (Application Specific Integrated Circuit). The processor may also comprise board memory for caching purposes. The calculating unit 32 is connected to the antenna 31 by means of a lead L2, such that signals received can be processed by the calculating unit.

The handheld wireless signal transceiver 30 further comprises an energy source BAT which is adapted to energize the antenna 31 by means of a lead L1 and adapted to energize the calculating unit 32 by means of a lead L3.

Figure 3:
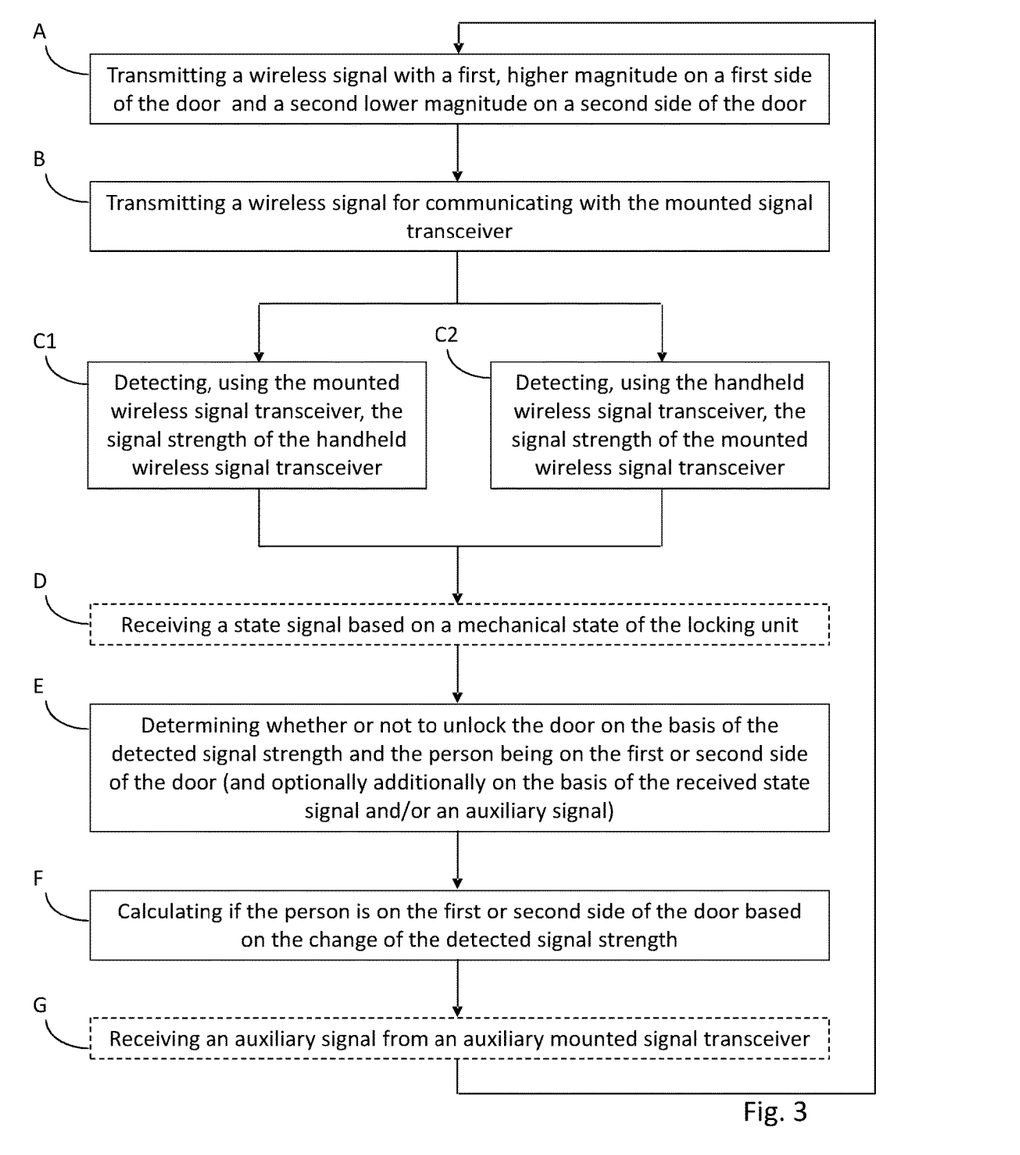
FIG. 3 is a flow chart of an embodiment of a method using the locking system

FIG. 3 is a flowchart of an embodiment of a method of using the locking system described herein. According to this embodiment the method comprises A transmitting a wireless signal with a first higher magnitude on a first side of a door (such as the door 10 of FIG. 1), and a second lower magnitude on a second side of the door, using a mounted wireless signal transceiver (such as for example described with reference to FIG. 2*a*), and B transmitting, using a handheld wireless signal transceiver (such as for example described under reference to FIG. 2*b*), a wireless signal for communicating with the mounted wireless signal transceiver. The method further comprises one of the steps of C1 detecting, using the mounted wireless signal transceiver, the signal strength of the handheld wireless signal transceiver, and C2 detecting, using the handheld wireless signal transceiver, the signal strength of the mounted wireless signal transceiver, and the step of E determining whether or not to unlock the door on the basis of the detected signal strength and the information related to the person being on the first or second side of the door which is fetched from a memory of a device. After the step of detecting the signal strength has been performed, a calculating unit performs the step of F calculating if the person is on the first or second side of the door based on the change of the detected signal strength and updating the value stored in memory.

Optionally, the method could comprise the step D of receiving a state signal based on a mechanical state of a door and the step of using the state signal in the step E of determining whether or not to unlock the door. In some embodiments, the mechanical state could have been sent before and stored in for example a calculating unit.

Also optionally, the method could comprise the step G of receiving an auxiliary signal from an additional mounted wireless signal transceiver to increase the accuracy in the determination with regards to the handheld wireless signal transceiver being on the first or second side of the door.

The method could additionally be preceded by the steps of the mounted and handheld wireless signal transceivers detecting each other and connecting for example by means of a connecting procedure.

The steps C1 and C2 could for example include detecting RSSI of the signals.

Figure 4:
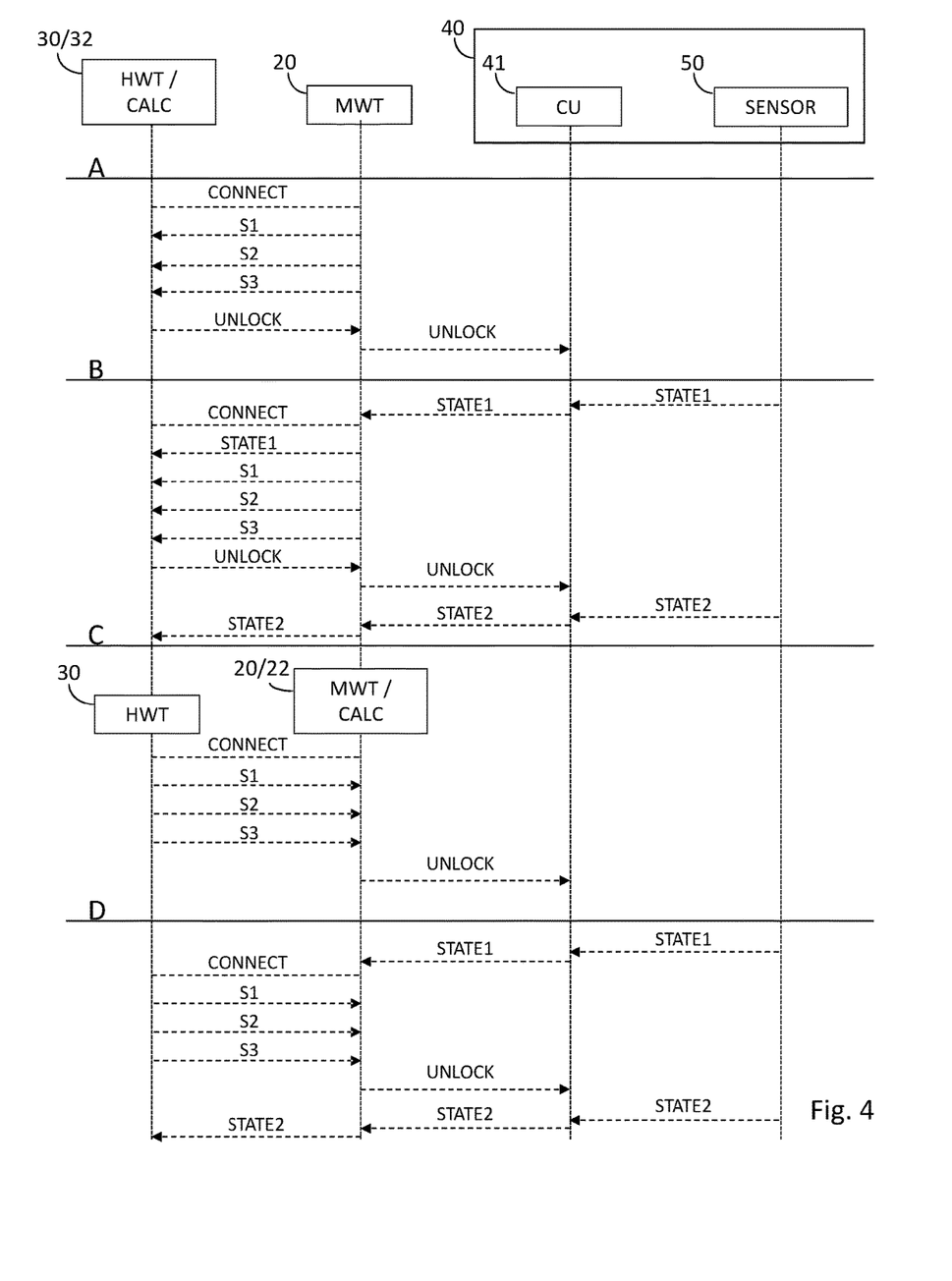
FIG. 4 is a signaling diagram describing the use of four embodiments of the locking system.

FIG. 4 is a signaling diagram displaying the signaling in four alternative embodiments. In embodiments A and B the calculating unit 32 is placed in the handheld wireless signal transceiver 30, whereas in embodiments C and D the calculating unit 22 is placed in the mounted wireless signal transceiver 20. In embodiments B and D, the locking unit 40 further comprises a sensor 50 adapted to sense the mechanical state of the door, such as if the door is opened or closed (further described with reference to FIG. 2*a*).

In the first embodiment, embodiment A, the handheld wireless signal transceiver 30 first performs a connection operation establishing an encrypted connection with the mounted wireless signal transceiver 20 to establish wireless connection there between. The mounted wireless signal transceiver 20 then starts transmitting wireless signals S1-S3, which are received by the handheld wireless signal transceiver 30. The handheld wireless signal transceiver 30 determines the signal strength i.e. RSSI of the received signals and calculates, using the calculating unit 32, the signal strength, e.g. max, min or average RSSI on the different sides of the door. The trigger for sending an UNLOCK signal to the mounted wireless signal transceiver 30 is to one part based on the calculation performed by the calculating unit 32 which calculates if the handheld wireless signal transceiver 30 is on the first or second side of the door and to a second part based on the determined signal strength, which indicates the distance between the mounted 20 and handheld 30 wireless signal transceiver, i.e. the distance between the person keeping the handheld wireless signal transceiver and the door.

If the person is on the pre-determined correct side of the door and close enough (such is the case after receipt of S3 in embodiment A) to be over the triggering threshold, the handheld wireless signal transceivers sends an "UNLOCK" signal to the mounted wireless signal transceiver 20 which in turn sends an "UNLOCK" signal to the control unit 41 which operates the locking mechanism to unlock the door.

Embodiment B is similar to embodiment A, with the difference that the locking unit further comprises a sensor 50 capable of generating a state signal on the basis of a mechanical state of the door. The sensor 50 sends a first state signal STATE1 to the control unit 41 which forwards the received state signal STATE1 to the mounted wireless signal transceiver 20. After the performed connection operation CONNECT with the handheld wireless transceiver 30, the mounted wireless transceiver 20 sends the first state signal STATE1 to the handheld wireless transceiver 30 which stores the mechanical state of the door (for example opened or closed) in the memory of the calculating unit 32. After receipt of the state signal STATE1, the mounted wireless signal transceiver 20 starts transmitting wireless signals S1-S3, which are received by the handheld wireless signal transceiver 30. The handheld wireless signal transceiver 30 determines the signal strength e.g. RSSI of the received signals and calculates, using the calculating unit 32, the signal strength which generates information with regards to the handheld wireless signal transceiver 30 being on the first or second side of the door.

In embodiment B the trigger for sending an UNLOCK signal to the mounted wireless signal transceiver 20 comprises three components: the information related to the person being on a first or second side of the door, the signal strength of the received signals S1-S3 (corresponding to the distance between the handheld wireless signal transceiver and the door) and the mechanical state of the door, i.e. no UNLOCK signal needs to be generated if the door is already open.

If the criteria above are fulfilled, such that the calculating unit 32 generates an UNLOCK signal, that unlock signal is sent to the mounted wireless signal transceiver 20 which forwards the UNLOCK signal to the control unit 41, which operates the locking unit to unlock the door. After an unlocking procedure has been completed, the sensor 50 sends a new state signal STATE2, containing information on the new mechanical state of the door, to the handheld wireless signal transceiver 30, via the control unit 41 and the mounted wireless signal transceiver 20, which replaces the mechanical state information stored in the memory of the calculating unit 32.

Embodiment C is very similar to embodiment A, the difference being that the calculating unit 32 of the handheld wireless signal transceiver 30 is replaced by a calculating unit 22 placed in the mounted wireless signal transceiver 20. The effect of placing the calculating unit in the mounted wireless signal transceiver 20 is that the power used for making the calculations is consumed in the mounted wireless signal transceiver 20 instead of in the handheld wireless signal transceiver 30, which makes it possible to make the handheld wireless signal transceiver 30 smaller and more portable.

The difference in terms of signaling between embodiment C and embodiment A is that after the initial connecting operation CONNECT the mounted wireless signal transceiver 20 receives and detects the signal strength of the wireless signals from the handheld wireless signal transceiver 30, thus determining the RSSI and rate of change of RSSI. The mounted wireless signal transceiver 20 then calculates, by means of the calculating unit 22, the location of the handheld wireless signal transceiver 30 in relation to the door. When the trigger criteria is fulfilled, i.e. the handheld wireless signal transceiver 30 is on the correct side of the door and close enough to the door, the mounted wireless signal transceiver 20 sends an UNLOCK signal to the control unit 41, which in turn operates the locking unit to unlock the door.

Embodiment D is a fourth alternative in which the calculating unit 22 is placed in the mounted wireless signal transceiver 20, and the system comprises the state sensor 50 as described with reference to embodiment B. The sensor 50 transmits a state signal STATE1 to the mounted wireless signal transceiver 20, via the calculating unit 41. The calculating unit 22 in the mounted wireless signal transceiver 20 stores the mechanical state of the door in memory and, as in embodiment B, uses the mechanical state in determining (together with the position of the handheld wireless signal transceiver calculated by means of the RSSI of the signals S1-S3) whether or not to send an UNLOCK signal to the control unit 41.

After an unlocking procedure has been completed upon receipt of an UNLOCK signal, the sensor 50 sends a new state signal STATE2, containing information on the new mechanical state of the door, to the mounted wireless signal transceiver 20, via the control unit 41, which replaces the mechanical state information stored in the memory of the calculating unit 22.

A combination of embodiments A, B and C, D is also conceivable, such that the calculations takes place in both the handheld and mounted transceivers on the basis of for example capacity of the batteries of the units.

Figure 5:
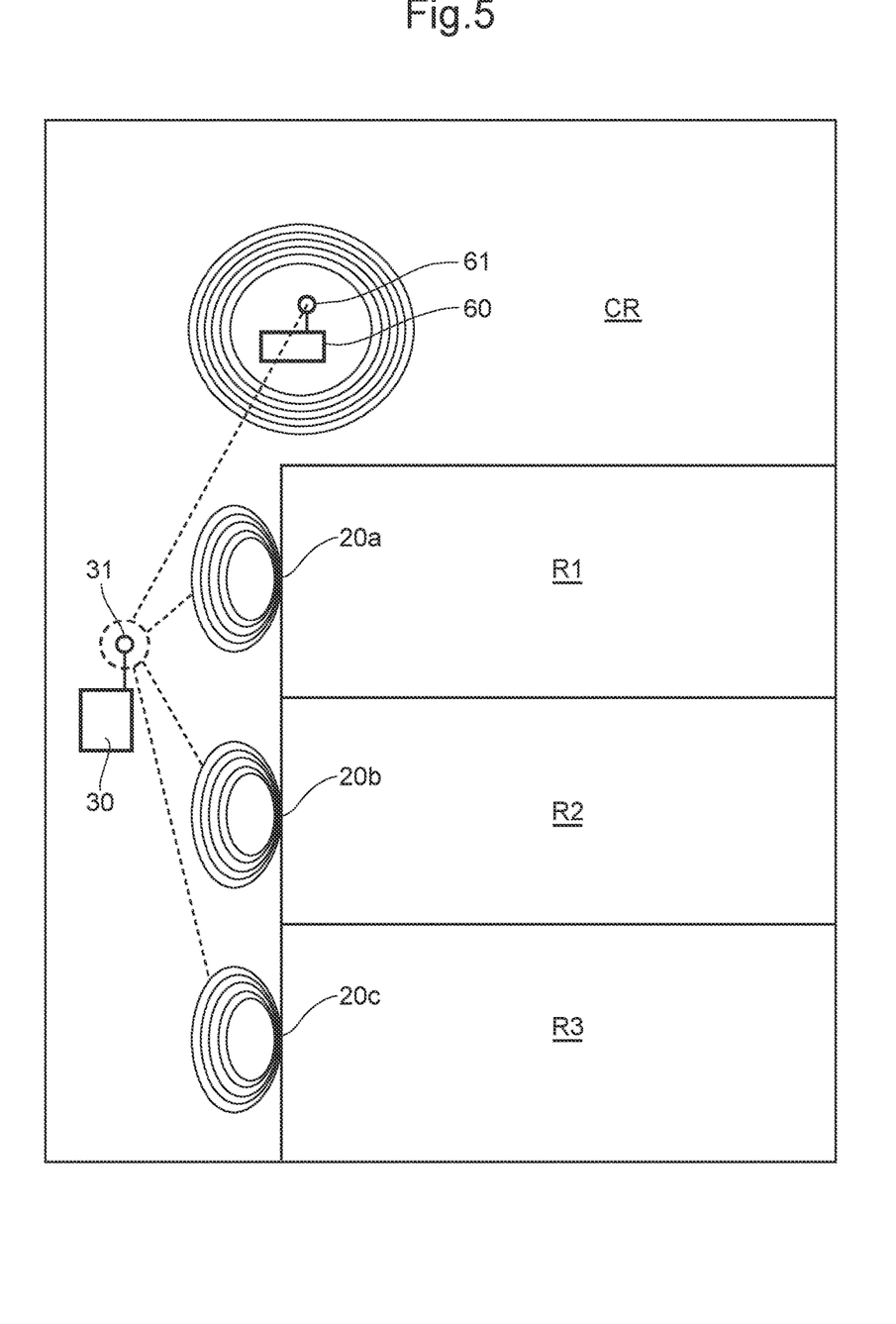
FIG. 5 is a schematic overview of the locking system when applied in a home for physically or mentally disabled persons.

FIG. 5 shows an embodiment of the locking system, when the system is used in a home for physically or mentally (e.g. dementia) disabled persons, in a schematic view. The system includes the handheld wireless signal transceiver 30 with a substantially omni-directional antenna 31, and three mounted wireless signal transceivers 20*a*, 20*b* and 20*c* mounted in connection with doors to rooms R1, R2 and R3. The system also comprises a central unit 60 also comprising a substantially omni-directional antenna 61. The central unit 60 is adapted to communicate with the handheld wireless signal transceiver 30 such that the device remains connected when away from the mounted wireless signal transceiver and/or for uploading or downloading data from the handheld wireless signal transceiver 30. The handheld wireless signal transceiver 30 is programmed to function as a key for one of the doors to the rooms R1-R3 i.e. by connecting and signaling with one of the mounted wireless signal transceivers, such as further described with reference to FIG. 1*a* and FIG. 1*b*. The handheld wireless signal transceiver may further be adapted to listen for RSSI values from additional mounted wireless transceivers e.g. 20*b*, 20*c* or 60 as auxiliary wireless signal transceivers, which may function as an extra source of information with regards to which side of the door the handheld wireless transceiver 30 is located. In normal cases the handheld wireless transceiver 30 may connect to the central unit 60 when out of reach for 20*a* to save power and to use functionality of the central unit 60.

The central unit 60, which could be used for uploading or downloading data to handheld wireless transceivers 30, could be connected to a monitoring system which could be operated by the staff of the home. Information with regards to the persons being inside or outside their rooms R1-R3 or in the community room CR could for example be used to make sure that no one is lost or injured. In alternative embodiments, the mounted wireless transceivers 20 could be connected to the Internet or to an internal network which may replace the central unit 60. It is further possible that several handheld wireless signal transceivers are connected to the same mounted wireless signal transceiver, such that multiple persons can enter the same door, or, that a single handheld wireless signal transceiver can connect to a plurality of mounted wireless signal transceivers and thus function as a master key.

Any detailed description should be interpreted in its broadest outline as a general summary of the invention, and please note that any embodiment or part of embodiment as well as any method or part of method could be combined in any way.

The invention claimed is:

1. A locking system for door or passage locking, the system comprising:
   a lock adapted to lock and unlock a door;
   a mounted wireless signal transceiver connected to the lock;
   a handheld wireless signal transceiver adapted to communicate with the mounted wireless signal transceiver, wherein the mounted wireless signal transceiver comprises a single antenna with a directional configuration such that a first higher magnitude lobe is directed away from a first side of the door and a second lower magnitude lobe is directed away from a second side of the door, and wherein the handheld wireless signal transceiver is adapted to detect a signal strength of a wireless signal transmitted from the single antenna of the mounted wireless signal transceiver; and
   a processor adapted to calculate if the handheld wireless transceiver is on the first or second side of the door based on a change in the detected signal strength of the wireless signal transmitted from the single antenna of the mounted wireless signal transceiver, and wherein the processor is adapted to determine whether or not to unlock the door on the basis of the detected signal strength and the calculated information related to the handheld wireless transceiver being on the first or second side of the door.

2. The system according to claim 1, wherein the handheld wireless signal transceiver is further adapted to calculate or receive Received Signal Strength Indication (RSSI) from at least one auxiliary wireless signal transceiver.

3. The system according to claim 1, wherein the system further comprises a central unit adapted to communicate with the handheld wireless signal transceiver, such that the handheld wireless signal transceiver can remain connected when being away from the mounted wireless signal transceiver.

4. The system according to claim 1, wherein the system further comprises a central unit adapted to communicate with the handheld wireless signal transceiver for uploading or downloading data from the handheld wireless signal transceiver.

5. The system according to claim 1, wherein the handheld wireless signal transceiver is adapted to detect signal strength by detecting Received Signal Strength Indication (RSSI).

6. A mounted wireless signal transceiver comprising:
   at least one control lead configured to connect to a lock that is adapted to lock and unlock a door;
   a single antenna, wherein the single antenna is configured with a directional configuration such that a first higher magnitude lobe is directed away from a first side of the door and a second lower magnitude lobe is directed away from a second side of the door, and wherein the mounted wireless signal transceiver is adapted to detect a signal strength of a wireless signal transmitted from a handheld wireless signal transceiver using the single antenna configured with the directional configuration; and
   a processor configured to calculate if the handheld wireless transceiver is on the first or second side of the door based on a change in the detected signal strength, and wherein the processor is adapted to determine whether or not to unlock the door on the basis of the detected signal strength and the calculated information related to the handheld wireless transceiver being on the first or second side of the door.

7. A method for use in a locking system, the method comprising:
   transmitting, using a handheld wireless signal transceiver, a wireless signal;
   detecting, using a mounted wireless signal transceiver, a signal strength of the wireless signal transmitted from the handheld wireless signal transceiver, wherein the mounted wireless signal transceiver comprises a single antenna with a directional configuration such that a first higher magnitude lobe is directed away from a first side of a door and a second lower magnitude lobe is directed away from a second side of the door;
   calculating, using a processor, if the handheld wireless transceiver is on the first or second side of the door based on a change of the detected signal strength; and
   determining whether or not to unlock the door on the basis of the detected signal strength and the calculated information related to the handheld wireless transceiver being on the first or second side of the door.

8. The method according to claim 7, wherein calculating if the handheld wireless transceiver is on the first or second side of the door is performed by the processor that is comprised in the mounted wireless signal transceiver.

9. The method according to claim 7, further comprising receiving, at the processor, a state signal based on a mechanical state of the door, and determining whether or not to unlock the door on the basis of the received state signal.

10. The method according to claim 7, further comprising the handheld wireless signal transceiver to calculate or receive Received Signal Strength Indication (RSSI) from at least one auxiliary wireless signal transceiver.

11. The method according to claim 7, further comprising connecting the handheld wireless signal transceiver to a central unit adapted to communicate with the handheld wireless signal transceiver, such that the handheld wireless signal transceiver may remain connected when being away from the mounted wireless signal transceiver.

12. The method according to claim 7, further comprising connecting the handheld wireless signal transceiver to a central unit adapted to communicate with the handheld wireless signal transceiver for uploading or downloading data from the handheld wireless signal transceiver.

13. The method according to claim 7, wherein detecting signal strength comprises detecting Received Signal Strength Indication (RSSI).

14. The method according to claim 7, wherein the step of calculating if the handheld wireless transceiver is on the first or second side of the door based on a change in the detected signal strength comprises the step of comparing a signal strength from a first side of the door with a signal strength from a second side of the door.

15. A locking system for door or passage locking, the system comprising:
   a lock adapted to lock and unlock a door;
   a handheld wireless signal transceiver adapted to transmit a wireless signal; and a mounted wireless signal transceiver connected to the lock, wherein the mounted wireless signal transceiver comprises a single antenna with a directional configuration such that a first higher magnitude lobe is directed away from a first side of the door and a second lower magnitude lobe is directed away from a second side of the door, and wherein the mounted wireless signal transceiver is adapted to detect a signal strength of the wireless signal transmitted from the handheld wireless signal transceiver; and a processor adapted to calculate if the handheld wireless transceiver is on the first or second side of the door based on a change in the detected signal strength of the wireless signal transmitted from the handheld wireless signal transceiver, and wherein the processor is adapted to determine whether or not to unlock the door on the basis of the detected signal strength and the calculated information related to the handheld wireless transceiver being on the first or second side of the door.

16. The system according to claim 15, wherein the directional configuration of the single antenna of the mounted wireless signal transceiver is such that the mounted wireless signal transceiver is capable of receiving a lower magnitude signal from the handheld wireless transceiver on the first side of the door than the mounted wireless signal transceiver is capable of receiving from the second side of the door.

17. The system according to claim 15, wherein the single antenna is a patch antenna, the first higher magnitude lobe corresponds to a main lobe of the patch antenna, and the second lower magnitude lobe corresponds to a minor lobe of the patch antenna.

18. The system according to claim 15, wherein the lock comprises a sensor capable of generating a state signal on the basis of a mechanical state of the door, and wherein the processor is further adapted determine whether or not to unlock the door on the basis of the received state signal.

19. The system according to claim 15, wherein the processor adapted to calculate if the handheld wireless transceiver is on the first or second side of the door based on a change in the detected signal strength by comparing a signal strength from a first side of the door with a signal strength from a second side of the door.

20. The system according to claim 15, wherein the lock comprises an electrical motor adapted to operate to unlock the door.

21. The system according to claim 15, wherein the lock comprises a solenoid adapted to operate to unlock the door.

22. The system according to claim 15, wherein the antenna is a patch antenna in the mounted transceiver.

* * * * *